(12) United States Patent
Clarke

(10) Patent No.: US 6,324,846 B1
(45) Date of Patent: Dec. 4, 2001

(54) EXHAUST GAS RECIRCULATION SYSTEM FOR AN INTERNAL COMBUSTION ENGINE

(75) Inventor: John M. Clarke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/536,260

(22) Filed: Mar. 27, 2000

Related U.S. Application Data

(60) Provisional application No. 60/127,069, filed on Mar. 31, 1999.

(51) Int. Cl.[7] .................................................... F02B 33/44
(52) U.S. Cl. ................................ 60/605.2; 60/612; 60/616
(58) Field of Search .......................... 60/605.2, 612, 60/599, 604, 616

(56) References Cited

U.S. PATENT DOCUMENTS 2,848,866 * 8/1958 Geislinger ........................ 60/604 X
3,141,293 * 7/1964 Crooks ............................. 60/604 X
5,105,624 * 4/1992 Kawamura ....................... 60/612 X
6,112,523 * 9/2000 Kamo et al. ......................... 60/612

* cited by examiner

Primary Examiner—Hoang Nguyen
(74) Attorney, Agent, or Firm—James B. Golden; Larry G. Cain

(57) ABSTRACT

An exhaust gas recirculation system for use with an internal combustion engine comprising a heat exchanger, a first turbocharger, and a generator. The first turbocharger provides compressed fresh air to an intake manifold. The heat exchanger cools the exhaust gas for recirculation into the intake manifold. The generator provides turbocharger control by imparting stored energy back into the turbocharger. Turbocharger control allows the exhaust gas recirculation system to operate more efficiently and over a wide range of operating conditions.

12 Claims, 1 Drawing Sheet

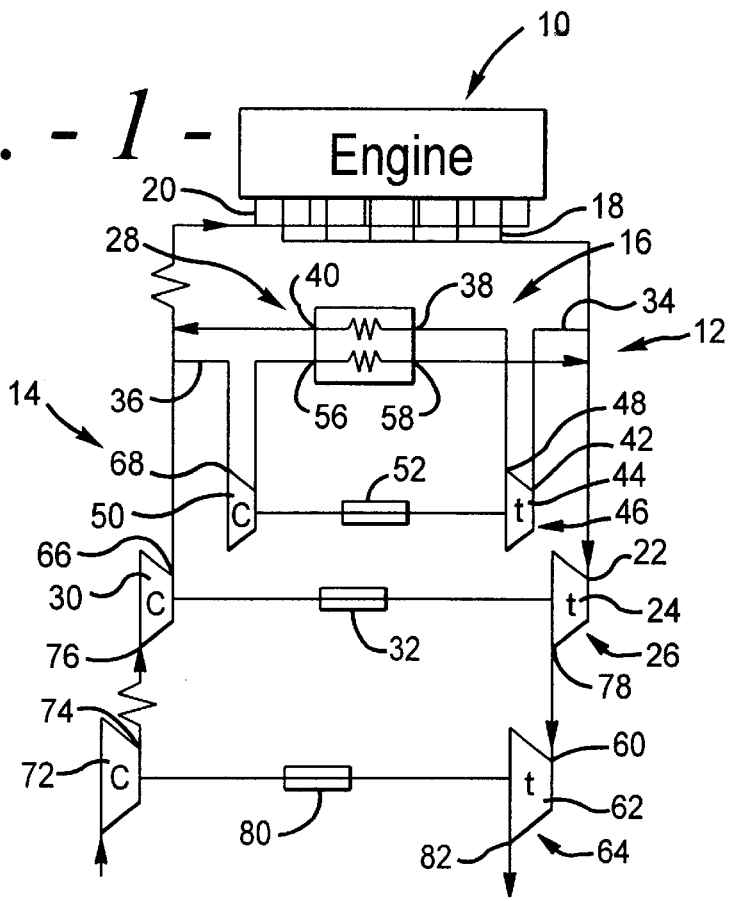
Fig. - 1 -
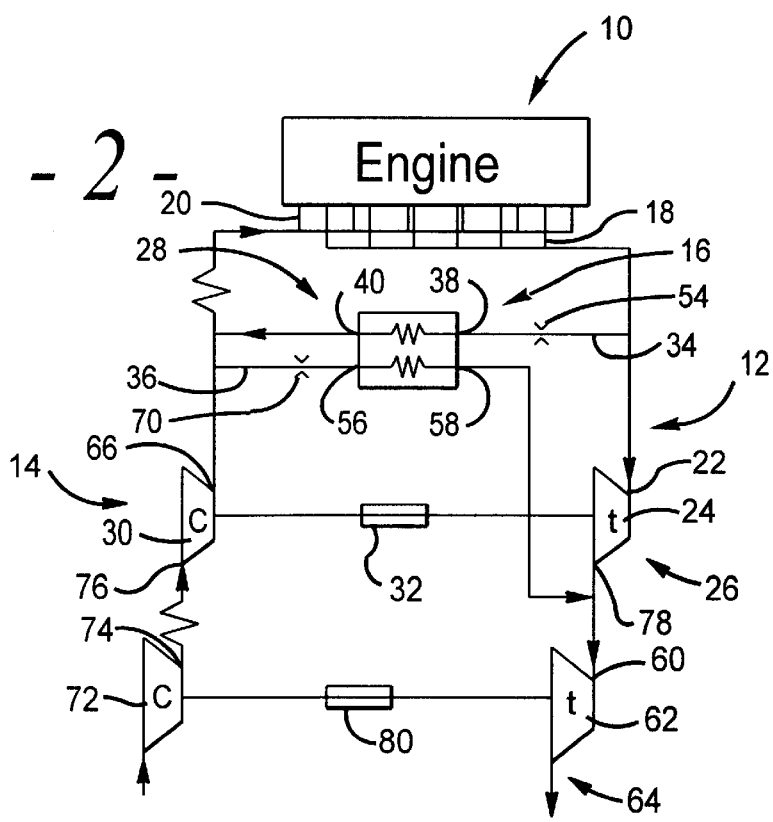
Fig. - 2 -

EXHAUST GAS RECIRCULATION SYSTEM FOR AN INTERNAL COMBUSTION ENGINE

This application claims the benefit of prior provisional patent application Ser. No. 60/127,069 filed Mar. 31, 1999.

TECHNICAL FIELD

This invention relates generally to an exhaust gas recirculation system for use with an internal combustion engine and more particularly to the exhaust gas recirculation system having a generator operatively connected to a turbocharger.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, $NO_x$ emissions have been reduced by reducing the intake manifold temperature, retarding the injection timing, and modifying the injection rate shape. And, the adverse effects on fuel consumption, particulate emissions engine performance have largely been alleviated through improvements in the basic engine design and fuel selection. For example, at the present time smoke and particulates have normally been controlled by design modifications in the combustion chamber, particulates are normally controlled by traps and filters, and sulfur oxides are normally controlled by the selection of fuels being low in total sulfur. This leaves carbon monoxide, unburned hydrocarbons and nitrogen oxides as the emission constituents of primary concern in the exhaust gas being emitted from the engine.

Many systems have been developed for recycling a portion of the exhaust gas through the engine thereby reducing the emission of these constituents into the atmosphere. The recirculation of a portion of exhaust gas is used to reduce $NO_x$ pollution emitted to atmosphere. In a naturally aspirated engine this process is relatively simple. But, with a turbocharged, the recirculation of a portion of the exhaust gas into the intake air becomes more complex because the intake pressure may be higher than the exhaust pressure during operating conditions. In many of such past system a volume of the exhaust gas from the engine was redirected to the intake air of the engine through the turbocharger and/or an aftercooler and to the engine. Such systems caused the premature plugging of aftercooler cores and malfunctioning of the systems. Additionally, with such recirculation system deterioration of the exhaust flow was caused by deposit buildup.

Prior turbocompounding systems typically use two turbines in series to raise the exhaust manifold pressure above the intake air. However, turbocompounded engines operating at low engine speeds operate inefficiently due to the decrease in the pressure ratio across the turbines in series. Prior techniques have coupled the compounded turbochargers to the engine using mechanical, hydraulic, and flexible couplings. Mechanical couplings need to be extremely strong to withstand the inertia of the turbine, thus adding cost to the coupling. Hydraulic couplings may be used but add complication to the system and additional losses of efficiency during engine operation. Flexible elements may also be used but may have a resonance problem due to the overlapping of frequencies of the flexible coupling the engine.

Various approaches have been used to address the adverse pressure gradient issue. For example, throttling valves have been installed in the air inlet, back pressure valves in the exhaust gas, intake manifold venturi tubes, etc. to provide sufficient pressure drop to get the exhaust gas to flow to the intake air. Although this provides the necessary pressure drop to functionally operate an exhaust gas recirculation system several disadvantages, such as, fuel consumption, emissions, and/or performance occur. In particular, exhaust gas systems which utilize a turbocharger have several performance disadvantages, such as balancing between the turbocharger compressor and turbine portions and turbine operating efficiencies.

The present invention is directed to overcoming one or more of the problem as set forth above.

DISCLOSURE OF THE INVENTION

In one aspect of the invention an exhaust gas recirculation system for use with an internal combustion engine comprises an intake manifold, an exhaust manifold, a heat exchanger, a first turbocharger, and a generator. The heat exchanger defines a donor portion which has an inlet end that is in fluid communication with the exhaust manifold and an outlet end which is in fluid communication with the intake manifold. A recipient portion of the heat exchanger has an inlet end and an outlet end. The first turbocharger defines a turbine section which has an inlet portion that is in fluid communication with the exhaust manifold and an outlet portion. A compressor section has an inlet portion and an outlet portion that is in fluid communication with the inlet end of the recipient portion of the heat exchanger and the intake manifold. The turbine section is drivingly connected to the compressor section. The generator is operatively connected to the first turbine section of the turbocharger.

In another aspect of the present invention an exhaust gas recirculation system for use with an internal combustion engine comprises an intake manifold, an exhaust manifold, a heat exchanger, a first turbocharger, and a generator. The heat exchanger defines a donor portion which has an inlet end that is in fluid communication with the exhaust manifold and an outlet end that is in fluid communication with the intake manifold. The inlet end of the donor portion has a first control member disposed therein. A recipient portion has an inlet end and an outlet end and the inlet end of the recipient portion has a second control member disposed therein. The first turbocharger defines a turbine section which has an inlet portion which is in fluid communication with the exhaust manifold and an outlet portion. A compressor section has an inlet portion and an outlet portion which is in fluid communication with the inlet end of the recipient portion of the heat exchanger and the intake manifold. The turbine section is drivingly connected to the compressor section. The generator is operatively connected to the first turbine section of the turbocharger.

BRIEF DESCRIPTION OF THE DRAWINGS

FIG. 1 is a diagrammatic schematic of an exhaust gas recirculation system for use with an internal combustion engine showing an embodiment of the present invention; and FIG. 2 is a diagrammatic schematic of an exhaust gas recirculation system for use with an internal combustion engine showing another embodiment of the present invention.

BEST MODE FOR CARRYING OUT THE INVENTION

Referring to FIG. 1 and FIG. 2, an internal combustion engine 10 is shown. Typical engine operation passes air through intake valves (not shown) into a combustion chamber (not shown). The intake valves are closed based on engine operating parameters, i.e. engine timing. With the intake valves closed or partially closed for engines 10 operating with retarded timing, a crankshaft (not shown) is rotated moving a piston (not shown) towards top dead center. The piston compresses the air in the combustion chamber. An injector (not shown) injects a quantity of fuel into the combustion chamber, generally when the piston is close to top dead center. The air mixes with the fuel is ignited thereby causing combustion to take place. The combustion byproducts, i.e. exhaust gases are then passed through exhaust valves (not shown). It is to be understood that the mixing of air and fuel may take place upstream from the combustion chamber and ignited by a spark plug (not shown), glow plug (not shown), and the like.

An exhaust gas system 12 passes exhaust gas produced from the combustion process of the engine 10 to the atmosphere. Exhaust gas systems 12 may utilize a system for recirculating exhaust gas from the exhaust gas system 12 to an air intake system 14. Typically, exhaust gas recirculation systems (i.e. EGR systems) 16 rout exhaust gas from an exhaust manifold 18 to the intake manifold 20. Engines 10 using turbochargers have exhaust gas from the exhaust manifold 18 routed to an inlet portion 22 of a turbine section 24 of a first turbocharger 26 before passing through a heat exchanger 28 of the exhaust gas recirculation system 16.

The exhaust gas that has been routed to the inlet portion 22 of the turbine section 24 of the first turbocharger 26 is in fluid communication with the exhaust manifold 18. The turbine section 24 of the first turbocharger 26 is drivingly connected to a compressor section 30 of the first turbocharger 26. The turbine section 24 of the first turbocharger 26 is also operatively connected to a generator 32. The generator 32 is electrically coupled to the engine 10. However, it should be recognized that the generator 32 may be mechanically and hydraulically coupled to the engine 10 without departing from the spirit of the invention. The generator 32 transfers energy to and from the first turbocharger 26 through such components as alternators and motors. The generator 32 may either absorb extra energy from operation of the first turbocharger 26 or impart energy that has been absorbed to increase speed of the first turbocharger 26. The absorbed energy from the first turbocharger 26 may be stored in a battery. However, it should be recognized that energy that is absorbed from the generator 32 may be used for engine braking, indirect power consumption, and the like without departing from the spirit of the invention.

The heat exchanger 28 of the EGR system 16 is disposed between the exhaust manifold 18 and the intake manifold. The exhaust passing through the heat exchanger 28 absorbs heat from the exhaust gas. However, it should be recognized that EGR systems 16 may include filters, traps and the like without departing from the spirit of the invention. The heat exchanger 28, such as a counter-flow primary surface heat exchanger 28, has a donor portion 34 and a recipient portion 36.

The donor portion 34 of the heat exchanger 28 has an inlet end 38 that is in fluid communication with the exhaust manifold 18. The heat exchanger 28 cools the exhaust gas that is passed from the exhaust manifold 18 of the engine 10. Cooling of the "hot" exhaust gas is accomplished by the heat exchanger 28 using techniques that are well known in the art. The "cooled" exhaust gas exits the heat exchanger 28 at an outlet end 40 of the donor portion 34. The "cooled" exhaust gas is fluidly communicated to the intake manifold 20 where it is mixed with fresh air.

The donor portion 34 as described above may have the "hot" exhaust gas from the exhaust manifold 18 routed to an inlet portion 42 of a turbine section 44 of a second turbocharger 46. The turbine section 44 of the second turbocharger 46 is in fluid communication with the exhaust manifold 18 at a position intermediate to the connection of the inlet portion 22 of the turbine section 24 of the first turbocharger 26 and the exhaust manifold 18. The "hot" exhaust gas passes through a turbine section 44 of a second turbocharger 46 and exits at an outlet portion 48 of the turbine section 44 of the second turbocharger 46. The outlet portion 48 of the turbine section 44 is fluidly connected with the inlet end 38 of the donor portion 34 of the heat exchanger 28. The turbine section 44 of the second turbocharger 46 is drivingly connected to a compressor section 50 of the second turbocharger 46 for compressing the fresh air. The turbine section 44 of the second turbocharger 46 is also operatively connected to a second generator 52. The second generator 52 is electrically coupled to the engine 10. However, it should be recognized that the second generator 52 may be mechanically and hydraulically coupled to the engine 10 without departing from the spirit of the invention. The second generator 52 transfers energy to and from the second turbocharger 46 through such components as alternators and motors. The second generator 52 may either absorb extra energy from operation of the second turbocharger 46 or impart energy that has been absorbed to increase speed of the second turbocharger 46. The absorbed energy from the second turbocharger 46 may be stored in a battery. However, it should be recognized that energy absorbed from the second generator 52 may be used for engine braking, indirect power consumption, and the like without departing from the spirit of the invention. Another embodiment, as shown in FIG. 2 has a first control member 54 disposed in the inlet end 38 of the donor portion 34. The first control member 54 may be an orifice, throttling valve, and the like without departing from the spirit of the invention. Use of the first control member 54, as shown in FIG. 2 or the second turbocharger 46, as shown in FIG. 1 controls the amount of exhaust gas that is communicated into the intake manifold 20.

The recipient portion 36 of the heat exchanger 28 has an inlet end 56 that is in fluid communication with the intake manifold 20 for passing fresh air from the compressor section 30 of the first turbocharger 26 to the heat exchanger 28. The fresh air exits the heat exchanger 28 at an outlet end 58 of the recipient portion 36 and is fluidly communicated to the turbine section 24 of the first turbocharger 26 or an inlet portion 60 of a turbine section 62 of a third turbocharger 64, as shown in FIG. 2. In one embodiment, as shown in FIG. 1 the recipient portion 36 has the inlet end 56 in fluid communication with the intake manifold 20 at a position intermediate to the connection of an outlet portion 66 of the compressor section 30 of the first turbocharger 26 and the intake manifold 20. The compressed fresh air from the compressor section 50 of the second turbocharger 46 is communicated to the recipient portion 36 of the EGR system 16. The compressed fresh air exits through an outlet portion 68 of the compressor section 50 of the second turbocharger 46. The outlet portion 68 is in fluid communication with the inlet end 56 of the recipient portion 36 of the heat exchanger 28.

Another embodiment, as shown in FIG. 2 has a second control member 70 disposed in the inlet end 56 of the recipient portion 36. The second control member 70 may be an orifice, throttling valve, and the like without departing from the spirit of the invention.

The air intake system 14, as shown in FIG. 1 has compressed air that is delivered from an outlet portion 74 of a compressor section 72 of a third turbocharger 64 in fluid communication with an inlet portion 76 of a compressor section 30 of the first turbocharger 26. It should be understood that the fresh air that is drawn into the compressor section 72 of the third turbocharger 64 may pass through filters and coolers without departing from the spirit of the invention. The first turbocharger 26 has the compressed air exit through an outlet portion 78 of the compressor section 30 of the first turbocharger 26 into an intake manifold 20 of the engine 10 and also into the recipient portion 36 of the EGR system 16.

The "hot" exhaust gas from the exhaust manifold 18 is communicated through an outlet portion 78 of the turbine section 24 of the first turbocharger 26 and into the inlet portion 60 of a turbine section 62 of the third turbocharger 64. The third turbocharger 64 may have the recipient portion 36 fluidly connected to an inlet portion 60 of the turbine section 62 of the third turbocharger 64 as shown in FIG. 2 without departing from the spirit of the invention. The turbine section 62 of the third turbocharger 64 is drivingly connected to the compressor section 72 of the third turbocharger. The turbine section 62 of the third turbocharger 64 is also operatively connected to a third generator 80. The turbine section 62 of the third turbocharger 64 is also operatively connected to a third generator 80. The third generator 80 is electrically coupled to the engine 10. However, it should be recognized that the third generator 80 may be mechanically and hydraulically coupled to the engine 10 without departing from the spirit of the invention. The third generator 80 transfers energy to and from the third turbocharger 64 through such components as alternators and motors. The third generator 80 may either absorb extra energy from operation of the third turbocharger 64 or impart energy that has been absorbed to increase speed of the third turbocharger 64. The absorbed energy from the third turbocharger 64 may be stored in a battery. However, it should be recognized that energy absorbed from the third generator 80 may be used for engine braking, indirect power consumption, and the like without departing from the spirit of the invention. An outlet portion 82 of the third turbocharger 64 expels exhaust gas into the atmosphere. It should be recognized that filters, noise suppressors, and the like may be used without departing from the spirit of the invention.

Industrial Applicability

In operation, the engine 10 combusts the air-fuel mixture in the combustion chamber and expels the byproducts, i.e. exhaust gas from the combustion chamber to the exhaust manifold 18. The exhaust gas system 12 of this invention has exhaust gas recirculation system 16 for fluidly communicating exhaust gas to the intake manifold 20.

Fresh air for combustion is compressed in the third turbocharger 64 and further compressed by the first turbocharger 26. Air filters are typically upstream of the turbochargers 26, 64 for filtration of particles. The compressed fresh air exiting the compressor section 30 of the first turbocharger 26 is fluidly communicated to the intake manifold 20 and also to the heat exchanger 28 of the exhaust gas recirculation system 16. The fresh air fluidly communicated to the heat exchanger 28 cools the exhaust gas that is fluidly communicated to the intake manifold 20. The fresh air is typically compressed further to provide increased efficiency of the exhaust gas recirculation system 16. The second turbocharger 46 is used in one embodiment, as shown in FIG. 1 to provide compressed air fluidly communicated through the heat exchanger 28 by way of the recipient portion 36, and into the exhaust gas system 12. Another embodiment, as shown in FIG. 2 uses the second control member 70 to provide the compressed air fluidly communicated to the heat exchanger 28. The fresh air that is not fluidly communicated to the heat exchanger 28 is routed to the intake manifold 20 where it continues through the air intake system 14 of the engine 10 and used for combustion.

Exhaust gas from engine combustion passes through the exhaust manifold 18 and into the engine exhaust gas system 12. This invention uses exhaust gas recirculation 16 coupled with the exhaust gas system 12. The donor portion 34 of the exhaust gas recirculation system 16 has the inlet end 38 in fluid communication with the exhaust manifold 18. The donor portion 34 provides recirculated exhaust gas to the intake manifold 20. The exhaust gas passes through the inlet end 38 of the donor portion 34, is cooled by the fresh air passing through the inlet end 56 of the recipient portion 36 and exits the heat exchanger 28 at the outlet end 40 of the donor portion 34. The second turbocharger 46 is used to provide exhaust gas recirculation over a wide range of operating conditions. The second turbocharger 46 provides boost to the exhaust gas which increases the pressure of the exhaust gas to at least the pressure of the fresh air entering the intake manifold 20. Control members 54, 70, such as orifices may be used in place of the second turbocharger 46 to increase the pressure of the exhaust gas to at least the pressure of the fresh air entering the intake manifold 20. In one embodiment, as shown in FIG. 1, the exhaust gas enters the turbine section 44 of the second turbocharger 46 at the inlet portion 42. The turbine section 44 of the second turbocharger 46 is drivingly connected to the compressor section 50 of the second turbocharger 46 for compression of the fresh air used in the exhaust gas recirculation system 16. The use of the second turbocharger 46 and the second generator 52 allows the exhaust gas recirculation system 16 to have a quicker response at start up and light load conditions. The turbine section 44 of the second turbocharger 46 provides the necessary pressure needed to have exhaust gas fluidly communicated to the intake manifold 20. The pressure that is required varies based on the load at which the engine 10 is operating. The second turbocharger 46 will not always need to operate at maximum rating. The second generator 52 transfers the energy not used by the second turbocharger 46 to the engine 10. In another embodiment, as shown in FIG. 2 the first control member 54 disposed in the donor portion 34 provides the needed pressure for the exhaust gas to be fluidly communicated to the intake manifold 20.

The exhaust gas bypassing the exhaust gas recirculation system 12 is fluidly communicated to the turbine section 24 of the first turbocharger 26. The turbine section 24 is drivingly connected to the compressor section 30 of the first turbocharger 26 for compressing the fresh air. The generator 32 generally operates in the same manner as the second generator 52 which has been discussed in detail previously. The exhaust gas exits the outlet portion 78 of the first turbocharger 26 and is fluidly communicated to the turbine section 62 of the third turbocharger 64. The turbine section 62 is drivingly connected to the compressor section 72 of the third turbocharger 64 for compressing the fresh air. The third generator 80 generally operates in the same manner as the generator 32 and second generator 52 which has been discussed in detail previously.

Exhaust gas recirculation systems 16 benefit from the use of generators 32, 52, 80 that are electrically coupled to the engine 10. Previous attempts have used mechanical, hydraulic, and flexible coupling techniques. The mechanical coupling uses a stiff direct gear ratio to engine crankshafts. The mechanical coupling needs to be extremely strong due to the effective inertia of the turbine section of the turbocharger. The hydraulic coupling is complicated and provides additional loses to the engine 10. The flexible element may cause resonance problems due to the natural frequency of the coupling tends to be within the natural frequency of the engine 10. Having the generators 32, 52, 80 electrically couple to the engine 10 provides improved turbocharger 26, 46, 64 response. Having the generators 32, 52, 80 store energy and imparting that energy back into the turbochargers 26, 46, 64 increases the response time. The increased response time benefits engine operation at start up and light load conditions. Having the ability to impart energy is enhanced by using multiple turbochargers in series, i.e. turbocompounding is an effective way of raising efficiencies at high loads.

Other aspects, objects and advantages of this invention can be obtained from a study of the drawings, the disclosure and the appended claims.

What is claimed is:

1. An internal combustion engine having an intake manifold in which intake air is communicated to said internal combustion engine and an exhaust manifold having an exhaust expelled therethrough from a combustion process in said internal combustion engine, said internal combustion engine comprising:
    an exhaust gas recirculation system having a portion of said exhaust from said combustion process in said internal combustion engine recirculated back into said intake manifold;
    a heat exchanger defining a donor portion having an inlet end being in fluid communication with said exhaust manifold and an outlet end being in fluid communication with said intake manifold, a flow of exhaust passing through said donor portion of said heat exchanger, and a recipient portion having an inlet end and an outlet end and having said intake air passing therethrough;
    a first turbocharger defining a turbine section having an inlet portion being in fluid communication with said exhaust manifold and an outlet portion, and a compressor section having an inlet portion and an outlet portion being in fluid communication with said inlet end of said recipient portion of said heat exchanger and said intake manifold, and said turbine section being drivingly connected to said compressor section; and
    a generator being operatively connected to said first turbine section of said turbocharger.

2. An internal combustion engine, as set forth in claim 1, wherein a second turbocharger defining a turbine section having an inlet portion being in fluid communication with said exhaust manifold at a position intermediate said connection of said inlet portion of said turbine section of said first turbocharger and said exhaust manifold and an outlet portion being fluidly connected to said inlet end of said donor portion of said heat exchanger, and said second turbocharger has a compressor section having an inlet portion and an outlet portion, and said turbine section of said second turbocharger being drivingly connected to said compressor section of said second turbocharger.

3. An internal combustion engine, as set forth in claim 2, wherein said compressor section of said second turbocharger having said inlet portion being in fluid communication with said intake manifold at a position intermediate said connection of said outlet portion of said compressor section of said first turbocharger and said intake manifold and an outlet portion being in fluid communication with said inlet end of said recipient portion of said heat exchanger.

4. An internal combustion engine, as set forth in claim 2, wherein a second generator being operatively connected to said turbine section of said second turbocharger.

5. An internal combustion engine, as set forth in claim 4, wherein a third turbocharger defining a turbine section having an inlet portion being in fluid communication with said outlet portion of said turbine section of said first turbocharger, and said third turbocharger has a compressor section having an outlet portion, and said turbine section of said third turbocharger being drivingly connected to said compressor section of said third turbocharger.

6. An internal combustion engine, as set forth in claim 5, wherein said compressor section of said third turbocharger having said outlet portion being in fluid communication with said inlet portion of said compressor section of said first turbocharger.

7. An internal combustion engine, as set forth in claim 6, wherein said inlet portion of said turbine section of said second turbocharger being in fluid communication with said inlet portion of said turbine section of said third turbocharger.

8. An internal combustion engine, as set forth in claim 6, wherein a third generator being operatively connected to said turbine section of said third turbocharger.

9. An internal combustion engine having an intake manifold in which intake air is communicated to said internal combustion engine and an exhaust manifold having an exhaust expelled therethrough from a combustion process in said internal combustion engine, said internal combustion engine comprising:
    an exhaust gas recirculation system having a portion of said exhaust from said combustion process in said internal combustion engine recirculated back into said intake manifold;
    a heat exchanger defining a donor portion having an inlet end being in fluid communication with said exhaust manifold and an outlet end being in fluid communication with said intake manifold, a flow of exhaust passing through said donor portion of said heat exchanger, said inlet end of said donor portion having a first control member disposed therein, a recipient portion having an inlet end and an outlet end and having said intake air passing therethrough, and said inlet end of said recipient portion having a second control member disposed therein;

a first turbocharger defining a turbine section having an inlet portion being in fluid communication with said exhaust manifold and an outlet portion, and a compressor section having an inlet portion and an outlet portion being in fluid communication with said inlet end of said recipient portion of said heat exchanger and said intake manifold, and said turbine section being drivingly connected to said compressor section; and a generator being operatively connected to said first turbine section of said turbocharger.

10. An internal combustion engine, as set forth in claim 9, wherein a third turbocharger defining a turbine section having an inlet portion being in fluid communication with said outlet portion of said turbine section of said first turbocharger and an outlet portion, and said third turbocharger has a compressor section having an inlet portion and an outlet portion, and said turbine section of said third turbocharger being drivingly connected to said compressor section of said third turbocharger.

11. An internal combustion engine, as set forth in claim 10, wherein said compressor section of said third turbocharger having said outlet portion being in fluid communication with said inlet portion of said compressor section of said first turbocharger.

12. An internal combustion engine, as set forth in claim 11, wherein a third generator being operatively connected to said turbine section of said third turbocharger.

* * * * *